United States Patent [19]

Jacobs et al.

[11] 3,789,150

[45] Jan. 29, 1974

[54] SUBSYSTEM DATA TRANSFER IN A TELEPHONE SYSTEM

[75] Inventors: Melvin A. Jacobs, Hinsdale; John W. Woodward, Schaumburg, both of Ill.

[73] Assignee: GTE Automatic Electric Laboratories Incorporated, Northlake, Ill.

[22] Filed: June 8, 1972

[21] Appl. No.: 260,952

[52] U.S. Cl. .......................................... 179/18 ET
[51] Int. Cl. .......................................... H04q 3/47
[58] Field of Search ................................ 179/18 ET

[56] References Cited

UNITED STATES PATENTS 3,550,083 12/1970 Heldman et al. .......... 340/146.1 BA
3,674,940 7/1972 Leyburn et al. ................ 179/18 ET

*Primary Examiner*—Thomas W. Brown
*Attorney, Agent, or Firm*—Robert J. Black

[57] ABSTRACT

An arrangement for transferring data between a translator and marker in a crosspoint switching system, where both translator and marker each contain internal clocks and operate asynchronously to each other. Data transfer is accomplished under control of clock pulses from a source external to both marker and translator.

6 Claims, 1 Drawing Figure

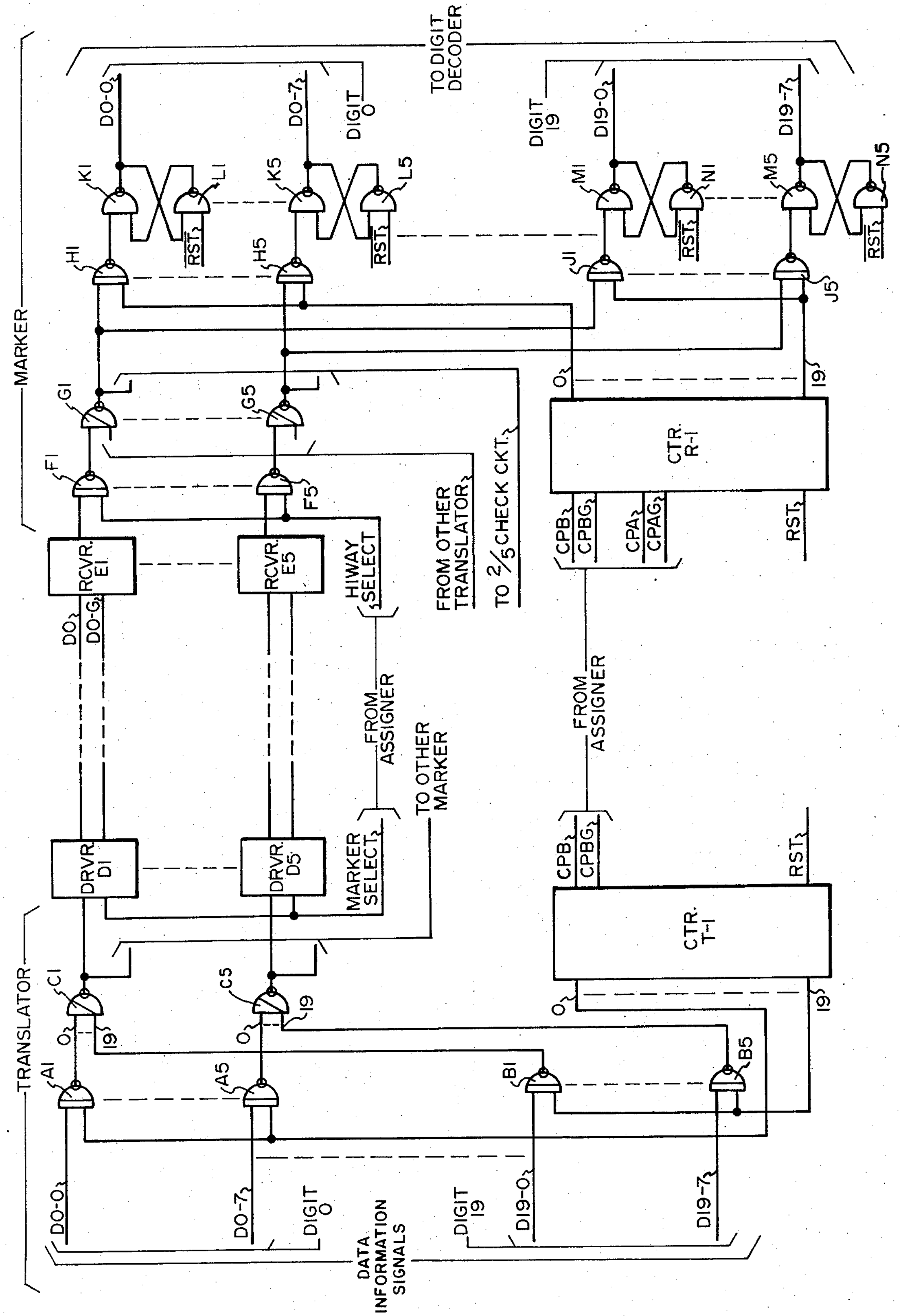
TO DIGIT DECODER
MARKER
TRANSLATOR
DATA INFORMATION SIGNALS
DIGIT 0
DIGIT 19
D0-0
D0-7
D19-0
D19-7
RCVR. E1
RCVR. E5
DRVR. D1
DRVR. D5
CTR. R-1
CTR. T-1
HIWAY SELECT
FROM ASSIGNER
MARKER SELECT
TO OTHER MARKER
FROM OTHER TRANSLATOR
TO 2/5 CHECK CKT.
CPB
CPBG
CPA
CPAG
RST

SUBSYSTEM DATA TRANSFER IN A TELEPHONE SYSTEM

BACKGROUND OF THE INVENTION

1. Field of the Invention

This invention relates to telephone systems and more particularly to a technique for the transfer of data between two asynchronously operated subsystems.

2. Description of the Prior Art

Many arrangements are known for the transfer of data between two subsystems. One of the simplest and fastest being a simultaneous transfer of an entire block of data using DC signals via parallel conductors. Typically however each subsystem performs a plurality of logical operations in a particular sequence. Therefore it is often conventional to use registers such as flip-flops or similar devices for the storage of data and control information used in the logical operation. In this manner input registers gated periodically as required provide information to the receiving subsystem. In certain instances the system may be provided with a data register comprising a plurality of flip-flops or similar devices with the originating subsystem register connected to the receiving subsystem register. Both subsystems operate on a common clock basis; the transmission of data from one system to the other presenting no particular problem.

However, in many telephone switching systems the use of common clock or control pulses for controlling the various subsystems is not included and the various subsystems may operate asynchronously to each other.

A technique sometimes used in the asynchronous systems is to provide control from the receiving system by exchange of control pulses only at those times that the receiving system is specifically ready to receive individual data transfer. Such a system is described in U.S. Pat. No. 3,550,083.

The complexity of this type of system and the requirements for a particular form of receiving subsystem limits adaptability however to certain specific applications.

SUMMARY OF THE INVENTION

An object of the present invention is to provide a technique for the transferring of data information from one subsystem to another within a telephone system.

A more particular object of the invention is to provide information transfer between subsystems that operate asynchronously to each other.

Briefly these and other objects of the present invention are realized in a specific embodiment thereof that utilizes the following described techniques of the present invention to meet the above objects.

In at least one form of common control telephone system it is conventional for incoming message lines to access a register-sender to receive the called address in either dial pulse or multifrequency mode from the incoming line or an incoming trunk. After sufficient called address digits have been received in the register-sender the register-sender calls for connection to a translator. When connection with the translator has been effected the register-sender effectively loads the called address information as well as originating class information into the translator. The translator then processes the information received through its internal structure to provide the necessary translation of the called switching data received from the register-sender. After the translator has received the called switching data from the register-sender it in turn calls for the services of a marker via an assigner. After an idle marker has been found and assigned to the translator, transmission of call switching data from the translator to the selected marker takes place.

In the call switching data transmitted from the translator to the marker the identity and location of the incoming line or trunk and the location identities of outgoing lines and trunks are available to the marker. The marker then performs the function of connecting the calling inlet to the appropriate outlet. Having performed the necessary interconnection function the marker will seize the appropriate outgoing path and check for path integrity from the register-sender through the switching matrix and the outgoing path. Having successfully completed the path integrity check the marker transfers control to the register-sender and releases ready to serve another call. In systems of this sort the individual subsystems (i.e., register-sender, translator, marker, etc.) may operate asynchronously to each other. Accordingly the present invention is directed to the technique of transferring information from a translator to a marker in a telephone system wherein the translator and marker are operated asynchronously to each other.

In the present system it is assumed that the translator and marker are asynchronous, each containing its own internal clock. Transfer of data therefore is accomplished under control of clock pulses from the associated assigner. In the arrangement shown the translator to marker data highway consists of five signal pairs over which 20 decimal digits each in a 2 out of 5 code are transferred via the highway in parallel by bit, serial by digit form.

Included in both the translator and marker are counters which are both incremented by the synchronizing clock pulses received from the assigner. The counter in the translator gates 2 out of 5 digits onto the highway to the marker. The counter in the marker which is also stepped by the same assigner pulses gates those digits received from the highway into consecutive storage locations within the marker. In the arrangement shown both counters may count to 20, being reset at completion of each full data transfer.

BRIEF DESCRIPTION OF THE DRAWING

The accompanying drawing is a combined symbolic logic and block diagram of those portions of a translator and marker involved in the transfer of data information from the translator to the marker within a telephone system in accordance with the present invention.

DETAILED DESCRIPTION

Referring now to the drawing the data output stage of a telephone system translator is shown connected to the data input portion of an associated marker. The other portions of the marker and translator are conventional in design and accordingly are not shown since they do not form a part of the present invention. It is assumed that a marker has been connected to the translator by means of an associated assigner not shown in the present diagram which is conventional in operation and as such does not form a portion of the present invention.

It should also be noted that the circuit details of drivers D1–D5, receivers E1–E5 and counters T1 and R1 are not shown, inasmuch as the detailed circuitry thereof does not form a portion of the present invention. Rather the only requirement of these circuit elements is that they perform the functions described below. The design of such units is well within the ability of those skilled in the art. Likewise the various "AND" gates and "OR" gates symbolically shown may assume any conventional form, consistent with system design parameters.

Within the translator portion of the present invention, translated call switching data is presented in the form of 20 digits (digits 0 through 19 inclusive), each digit consisting of 2 out of 5 code markings. That is to say two selections out of a code represented by the characters 0, 1, 2, 4 and 7. As shown in the drawing the digit 0 information is applied to leads DO-O through DO-7 which lead to a first series of gate circuits A1 through A5 inclusive. It should be noted that the intermediate code leads DO-1, DO-2 and DO-4 have not been shown nor have associated gate circuits A2, 3 and 4. In similar manner digit 19 information is applied to 2 out of the 5 gates B1 through B5 as well as all intermediate digit information relating to digits 1 through 18 inclusive. The leads and logic for the intermediate circuits have not been shown for purposes of brevity and simplicity.

It should be noted that gates A1 through A5 are operationally gated from the 0 output of the counter T1. Gates B1 through B5 are operationally gated from the count 19 or last output of counter T1. The outputs from the first gates (A1, B1) are connected to the zero input of gate C1 which is 1 of 5 OR gates having 20 inputs (0 through 19 inclusive). Gates C1 through C5 (C2, C3 and C4 are not shown) are used for gating the information on to the data highway between the translator and the marker. As indicated the output from gate 5 associated with digit 0 information is connected to the 0 input of gate C5 while gate B5 associated with digit 19 information is connected to the same gate at its 19 input. The output of gates C1 through C5 inclusive are coupled by driver circuits D1 through D5 to the data highway extending to the marker circuitry.

Each of the driver units is of conventional design, and provides the appropriate electronic signal interface with the associated marker. At the marker end of the highway where the information is received from the translator receiver circuits E1 through E5 (of conventional design) convert the incoming signals to appropriate levels for operation of the associated logic circuitry. The output of each of the receivers E1 through E5 inclusive are connected to AND gates F1 through F5 inclusive. These gates are made operational by a highway select signal received from the associated assigner. Inasmuch as the assigner has previously connected the translator shown to the marker shown it is assumed that appropriate signals have been applied on the marker select lead extending to driver circuits D1 through D5 inclusive and on the highway select lead extending to gates F1 through F5 inclusive. Signals from gates F1 through F5 inclusive are extended to OR gates G1 through G5 inclusive which also have input access from another translator in the same system.

The outputs of gates G1 through G5 are coupled to AND gates H1 through H5 inclusive associated with the digit 0 and to gates J1 through J5 inclusive which are associated with the digit 19 as well as to gates for the intermediate digits which have not been shown. Gates H1 through H5 are operationally gated by a 0 output count from counter R1 and gates J1 through J5 inclusive are operationally gated by count 19 output from counter R1, with the intermediate gates (not shown) gated by counts 2 through 18.

Gates H1 through H5 inclusive present inputs to latch circuits as do gates J1 through J5 inclusive. These latches for example made up of gates K1 and L1 connected to the output of gate H1 operate to indicate a status change representative of the input information received in the translator on the 20 outputs (digits 0 through 19 inclusive) of that portion of the marker circuitry shown. At this point the output leads carrying the information relative to digits 9 through 19 inclusive are connected to the digit decoder portion of the marker which is not shown as it does not form a portion of the present invention.

As shown in the drawing the counter T1 associated with the translator circuitry and the counter R1 associated with the marker circuitry (both of similar conventional design) are each incremented on the CPB (B clock pulses) received from the associated assigners. It should also be noted that CPA pulses (clock pulses A) which are 180° out of phase with the CPB pulses are presented to counter R1 for use in strobing the counter outputs in the marker, which gate the data into the memory latches (K1–L1, K5–L5, etc.) to eliminate race conditions.

Reset pulses (RST) and reset not pulses ($\overline{\text{RST}}$) are also utilized to reset the present equipment. Such pulses are derived from the internal control circuitry of the translator and marker.

A more complete understanding of the operation of the present invention may be had by reference to the following: When a register-sender applies for a translation after having received dialed digits, an assigner will assign a translator and marker such as those shown in the drawing to which it has been connected. The translator recognizes the incoming line or trunk identity and the dialed digits and proceeds to select the outlets over which the call is to be routed. It sends this identity plus that of the inlet to the marker. This information transferred from translator to marker is referred to as call switching data and after transmission to the marker is stored in the marker. When a marker has been connected by means of an assigner operation the marker will reset all of its stored registers and status latches such as those consisting of gates K1–L1, K5–L5, etc. and prepare to receive the call switching data from the translator. As noted previously the information received is in a 2 out of 5 marking form.

The translator transmits this data (up to a maximum of 20 digits) in the 2 out of 5 code as a parallel by bit, serial by digit data stream initiating on leads DO-0 to DO-7 for the first digit and concluding with the last digit, digit 19 on leads D19-0 through D19-7. This data is gated through the translator on to the data highway at drivers D1–D5 under command of counter T1. Counter T1 produces 20 outputs, (pulses 0 through 19 inclusive) which are used to control the gating through the translator of the called switching data. It will be recalled counter T1 is incremented with each CPB pulse received from the assigner. The assigner sends these pulses which are typically transmitted at a 10 microsecond rate to both the marker and the translator to step the digit counters T1 and R1 in both subsystems synchronously. Thus the translator's counter T1 gates the digits one by one from the highway into consecutive 5 bit storage registers in the marker where they are stored in the 2 out of 5 code.

As noted the outputs of gates G1 through G5 may be extended to a 2 out of 5 checking circuit. If this circuitry is included and a digit fails the check the marker may indicate a failure and cause the assigner to reoperate connecting a new marker to the translator.

Once the information is stored on the latches associated with the various digits in the translator, the information is available for decoding within the marker during the marker's operational sequence.

While a specific embodiment of the present invention has been shown it should be obvious to one skilled in the art that numerous modifications of the present invention may be made without departing from the spirit and scope of the present invention which is limited solely by the claims appended hereto.

What is claimed is:

1. A telephone system having a translator operated to translate call switching data into data information signals, a marker operable to connect an incoming communication circuit to an outgoing communication circuit in response to said data information signals, said translator and said marker operated asynchronously to each other, and a source of regular recurring pulse, the improvement comprising: transfer means operable to couple said data information signals from said translator to said marker, said transfer means including: a data highway connected between said translator and said marker; first gating means included in said translator including circuit connections to said data highway; second gating means included in said marker including circuit connections to said data highway; first counting means connected between said pulse source and said first gating means; second counting means connected between said pulse source and said second gating means; said first and second counting means each periodically incremented simultaneously in response to receipt of pulses periodically generated by said pulse source; said first gating means operated in response to each incrementation of said first counting means to gate said data information signals onto said data highway, and said second gating means operated in response to each incrementation of said second counting means to gate said data information signals from said data highway into said marker, whereby said marker is rendered operated.

2. A telephone system as claimed in claim 1 wherein said data highway comprises a plurality of communication paths.

3. A telephone system as claimed in claim 1 wherein said first gating means comprise a plurality of groups of first gates, each group operated in response to a different increment of said first counting means.

4. A telephone system as claimed in claim 3 wherein said first gating means further include a plurality of second gates, each including input circuit connections from each of said first gate groups and each further including output circuit connections to said data highway.

5. A telephone system as claimed in claim 1 wherein said second gating means comprise a plurality of groups of first gates, each group operated in response to a different increment of said second timing means.

6. A telephone system as claimed in claim 5 wherein said second gating means further include a plurality of groups of latch circuits, each group of latch circuits connected to a different group of said first gates, operated in response to operation of said first gates to record data information signals gated into said marker from said data highway.

* * * * *